United States Patent
Song et al.

(10) Patent No.: US 8,705,600 B1
(45) Date of Patent: *Apr. 22, 2014

(54) SYSTEM AND METHOD OF SELECTING A DATA DETECTION TECHNIQUE FOR A MIMO SYSTEM

(71) Applicant: Marvell International Ltd., Hamilton (BM)

(72) Inventors: Leilei Song, Sunnyvale, CA (US); Rohit U. Nabar, Sunnyvale, CA (US); Hui-Ling Lou, Sunnyvale, CA (US); Kedar Shirali, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,937

(22) Filed: Apr. 1, 2013

Related U.S. Application Data

(63) Continuation of application No. 13/346,476, filed on Jan. 9, 2012, now Pat. No. 8,411,786, which is a continuation of application No. 12/111,143, filed on Apr. 28, 2008, now Pat. No. 8,094,744.

(60) Provisional application No. 60/914,500, filed on Apr. 27, 2007.

(51) Int. Cl.
*H04B 3/46* (2006.01)

(52) U.S. Cl.
USPC .......................................... 375/224; 375/267

(58) Field of Classification Search
USPC ................................................ 375/224, 267
See application file for complete search history.

(56) References Cited

U.S. PATENT DOCUMENTS

| | | | |
|---|---|---|---|
| 5,459,846 A | 10/1995 | Hyatt | |
| 6,763,074 B1 | 7/2004 | Yang | |
| 6,901,046 B2 | 5/2005 | Hsu et al. | |
| 7,149,245 B2 | 12/2006 | Budka et al. | |
| 7,340,267 B2 | 3/2008 | Budka et al. | |
| 7,493,093 B2 | 2/2009 | Boerman et al. | |
| 8,094,744 B1 | 1/2012 | Song et al. | |
| 8,411,786 B1 | 4/2013 | Song et al. | |
| 2001/0050967 A1 | 12/2001 | Kuzminskiy et al. | |
| 2004/0171364 A1 | 9/2004 | Pukkila | |
| 2005/0094742 A1 | 5/2005 | Yee | |
| 2005/0270978 A1 | 12/2005 | Haines | |

(Continued)

OTHER PUBLICATIONS

Sponsor: LAN/MAN Standards Committee of the IEEE Computer Society; "Further Higher-Speed Physical Layer Extension in the 2.4 GHz Band"; Copyright 2001-2002 by the Institute of Electrical and Electronics Engineers, Inc., 347 East 47th Street, New York, NY 10017, USA; IEEE Std 802.11g/D2.80, May 2002; (Supplement to ANSI/IEEE Std 802.11, 1999 Edition; pp. 1-55.

(Continued)

*Primary Examiner* — Juan A Torres

(57) ABSTRACT

One or more communications parameters associated with a multiple input, multiple output (MIMO) signal transmitted by a transmitter are identified. The one or more communications parameters include one or more of (i) a number of receive antennas via which the MIMO signal is received, (ii) a number of spatial streams in the MIMO signal, and (iii) a signal to noise ratio (SNR) corresponding to the MIMO signal. A particular data detection technique of a plurality of data detection techniques employed by a receiver is selected in accordance with at least one of the one or more communications parameters.

23 Claims, 8 Drawing Sheets

(56) References Cited

U.S. PATENT DOCUMENTS

| | | | |
|---|---|---|---|
| 2006/0094363 | A1 | 5/2006 | Kang et al. |
| 2006/0233280 | A1 | 10/2006 | Tynderfeldt et al. |
| 2007/0058709 | A1 | 3/2007 | Chen et al. |
| 2007/0121738 | A1 | 5/2007 | Yoshii et al. |
| 2007/0206695 | A1 | 9/2007 | Ye et al. |

OTHER PUBLICATIONS

Syed Aon Mujtaba, Agere Systems, Inc., 555 Union Blvd., Allentown, PA 18109, U.S.A.; "TGn Sync Proposal Technical Specification"; IEEE P802.11, Wireless LANs; Doc.: IEEE 802.11-04/0889r6; May 18, 2005; pp. 1-131.

Sponsored by the LAN/MAN Standards Committee, "Part 16: Air Interface for Fixed Broadband Wireless Access Systems"; IEEE Std. 802.16-2004 (Revision of IEEE Std. 802.16-2001; IEEE, 3 Park Avenue, New York, NY 10016-5997, USA; Oct. 1, 2004, pp. 1-857. Sponsor: LAN/MAN Standards Committee of the IEEE Computer Society; "Part II: Wireless LAN Medium Access Control (MAC) and Physical Layer (PHY) Specifications: High-Speed Physical Layer in the 5 GHZ Band"; IEEE Std 802.11 a-1999, (Supplement to IEEE Std 802.11-1999); Copyright 1999 by the Institute of Electrical and Electronics Engineers, Inc.; Approved: Sep. 16, 1999, IEEE-SA Standards Board; pp. 1-91.

IEEE Std P802.11-REVma/06.0, "Unapproved Draft Standard for Information Technology—Telecommunications and information exchange between systems—Local and metropolitan area network-Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0).", 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

van Nee, et al. "The 802.11n MIMO-OFDM Standard for Wireless LAN and Beyond," Wireless Personal Communications, vol. 37, pp. 445-453 (Jun. 2006).

IEEE Std 802.16-2004 (Revision of IEEE Std 802.16-2001), "IEEE Standard for Local and metropolitan area networks; Part 16: Air Interface for Fixed Broadband Wireless Access Systems," The Institute of Electrical and Electronics Engineers, Inc., Oct. 1, 2004; 893 pages.

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, The Institute of Electrical and Electronics Engineers, Inc., Feb. 28, 2006.

Mixed Mode, 3x3, 40MHz, 0.8us GI, DNLOS, FLOATING-Point

| MCS # | Modulation | Nss | PHY Data Rate (kbps) | ZF SNR for 1%FER | ML SNR for 1%FER |
|---|---|---|---|---|---|
| 2 | QPSK, 3/4 | 1 | 40.500 | 10.500 | |
| 16 | BPSK, 1/2 | 3 | 40.500 | 17.000 | 11.000 |
| 4 | QAM16, 3/4 | 1 | 81.000 | 17.000 | |
| 10 | QPSK, 3/4 | 2 | 81.000 | 17.500 | 16.000 |
| 17 | QPSK, 1/2 | 3 | 81.000 | 20.000 | 13.500 |
| 6 | QAM64, 3/4 | 1 | 121.500 | 22.000 | |
| 18 | QPSK, 3/4 | 3 | 121.500 | 26.000 | 16.000 |
| 12 | QAM16, 3/4 | 2 | 162.000 | 23.000 | 21.000 |
| 19 | QAM16, 1/2 | 3 | 162.000 | 26.000 | 20.500 |
| 20 | QAM16, 3/4 | 3 | 243.000 | 33.000 | 25.500 |
| 14 | QAM64, 3/4 | 2 | 243.000 | 29.500 | 29.500 |

FIG. 7

SYSTEM AND METHOD OF SELECTING A DATA DETECTION TECHNIQUE FOR A MIMO SYSTEM

CROSS-REFERENCE TO RELATED APPLICATIONS

The present application is a continuation application of U.S. application Ser. No. 13/346,476, now U.S. Pat. No. 8,411,786, entitled "SYSTEM AND METHOD OF SELECTING A DATA DETECTION TECHNIQUE FOR A MIMO SYSTEM," filed on Jan. 9, 2012, which is a continuation application of U.S. application Ser. No. 12/111,143, now U.S. Pat. No. 8,094,744, entitled "SYSTEM AND METHOD OF SELECTING A DATA DETECTION TECHNIQUE FOR A MULTIPLE-INPUT MULTIPLE-OUTPUT (MIMO) SYSTEM," filed on Apr. 28, 2008, which claims the benefit of U.S. Provisional Application No. 60/914,500, filed Apr. 27, 2007, entitled "Performance Study of MIMO Equalization: Maximum Likelihood (ML) vs Zero Forcing (ZF)." The disclosures of the above-referenced applications are hereby incorporated by reference herein in their entireties.

BACKGROUND

1. Field of the Disclosure

Aspects of the present disclosure relate generally to wireless communication techniques, and more particularly to an equalization system and method alternately implementing different data detection techniques such as, for example, maximum likelihood and zero forcing.

2. Description of Related Art

Recently, the wireless communication industry has demonstrated an increasing interest in multiple input, multiple output (MIMO) systems. For example, MIMO beamforming systems have been considered in standards promulgated by the Institute of Electrical and Electronics Engineers (IEEE), most notably the IEEE 802.11n standard for wireless local area networks (WLANs). One advantage of beamforming methodologies is that they can increase the data rate between networked devices without the attendant increase in transmit power or bandwidth that would be necessary to achieve a similar data rate in MIMO systems without beamforming. Spatial multiplexing techniques for MIMO systems have also been considered in several standards such as the IEEE 802.11a/g standard. One advantage of spatial multiplexing is that it can increase channel capacity at high signal to noise ratios (SNRs).

One relatively popular MIMO equalization approach uses maximum likelihood (ML) data detection techniques. Generally, ML detection is considered optimal to the extent that it exhaustively searches all the distances between a received data vector and the universe of possible data vectors in the constellation to identify an optimal point or data stream, i.e., the data received on multiple dimensions are considered collectively. In many instances, an exhaustive search ML approach may be too complex to be practical, so many systems employ a limited ML approach constrained by hardware or processing bandwidth limitations. Zero forcing (ZF) techniques, on the other hand, forcibly decouple the data received on each dimension (e.g., by zeroing out inter-antenna interference), then detect or decode each received data stream individually. In that regard, ML techniques, even limited by system constraints, can exhibit significant performance advantages as compared to so-called "sub-optimal" ZF techniques, particularly for flat fading channels and lower order modulation schemes such as Quadrature Amplitude Modulation (QAM)-16 and Quaternary Phase Shift Keying (QPSK) operating at low SNRs.

In theory, under ideal conditions (i.e., no radio frequency (RF) or other system impairments), and where processing power is unlimited, it is expected that exhaustive search ML strategies will always provide superior results as compared to ZF strategies, particularly with respect to MIMO systems. However, in practical applications, RF impairments such as phase noise, flicker noise, power amplifier non-linearities, in-phase/quadrature-phase (I/Q) mismatches, and carrier frequency offsets, either individually or in combination, can affect performance of both ML and ZF techniques.

Therefore, it may be desirable in some instances to provide an equalization system and method that can advantageously employ different data detection techniques depending, for example, upon certain circumstances or certain operating conditions.

SUMMARY OF THE DISCLOSURE

In one embodiment, a method includes identifying, using one or more integrated circuit (IC) devices, one or more communications parameters associated with a multiple input, multiple output (MIMO) signal transmitted by a transmitter. The one or more communications parameters comprises one or more of (i) a number of receive antennas via which the MIMO signal is received, (ii) a number of spatial streams in the MIMO signal, and (iii) a signal to noise ratio (SNR) corresponding to the MIMO signal. The method also includes selecting, using one or more IC devices, a particular data detection technique of a plurality of data detection techniques employed by a receiver in accordance with at least one of the one or more communications parameters.

In another embodiment, a communication device comprises one or more integrated circuit (IC) devices configured to (i) implement a plurality of data detection techniques, (ii) identify one or more communications parameters associated with a multiple input, multiple output (MIMO) signal transmitted by a transmitter, wherein the one or more communications parameters comprises one or more of (i) a number of receive antennas via which the MIMO signal is received, (ii) a number of spatial streams in the MIMO signal, and (iii) a signal to noise ratio (SNR) corresponding to the MIMO signal, and (iii) select, in accordance with at least one of the one or more communications parameters, a particular data detection technique of the plurality of data detection techniques to process the MIMO signal.

BRIEF DESCRIPTION OF THE DRAWING FIGURES

FIG. 7 is a simplified table illustrating certain modulation and coding schemes for wireless fidelity applications.

DETAILED DESCRIPTION

Introduction

The equalization techniques described below may be utilized for flat fading channels as well as for frequency selective fading channels with orthogonal frequency division multiplexing (OFDM). For simplicity, the following discussion addresses the technology in the context of single carrier systems for flat fading channels; those of skill in the art will appreciate that the disclosed methodologies may readily be extended to be implemented in OFDM systems.

In order to evaluate the relative advantages of exhaustive search maximum likelihood (ML) techniques as compared to zero forcing (ZF) techniques, a performance study has been conducted for different multiple input, multiple output (MIMO) configurations under spatial multiplexing for two or three spatial streams. The study involved a wireless local area network (WLAN) as a system platform. It will be appreciated that the techniques described herein may have utility in connection with various communications standards including, but not limited to, the wireless fidelity (WiFi) (e.g., IEEE 802.11n and IEEE 802.11a/g) and the worldwide interoperability for microwave access (WiMAX) (e.g., IEEE 802.16) standards.

As noted above, exhaustive search ML techniques are generally expected to outperform ZF techniques under ideal conditions. However, one assumption that leads to this expectation is that only "white noise" (i.e., noise that is uncorrelated and of equal power among all dimensions) affects the MIMO system. In real applications, phase noise is a major contributor to errors caused by RF impairment; this phase noise may result from random phase changes in a local oscillator, for instance, when a received signal is down-converted to baseband. Phase noise can introduce inter-carrier interference (101), which nullifies the "white noise assumption." As set forth in more detail below, when phase noise reaches a threshold value at certain signal to noise ratios (SNRs), ML techniques may experience an error floor.

The performance study included 2×2, 2×3, 3×3, and 3×4 (transmitter antennae×receiver antennae) configurations, for Quaternary Phase Shift Keying (QPSK), Quadrature Amplitude Modulation (QAM)-16, and QAM-64 modulation schemes. The study considered all of the following RF impairments: phase noise; flicker noise (1/f noise); power amplifier non-linearities; in-phase/quadrature-phase (I/Q) mismatches; and carrier frequency offsets. Phase noise was considered at 150 kHz bandwidth with up to 1 degree root-mean-square (rms) θ values. The flicker noise value was −101 dBm, and the carrier offset values ranged from 60 kHz to 120 kHz.

FIGS. 1-4 are graphs illustrating results of performance studies comparing maximum likelihood techniques with zero forcing techniques and plotting frame error rates versus signal to noise ratios for several modulation and coding schemes.

Figure 1:
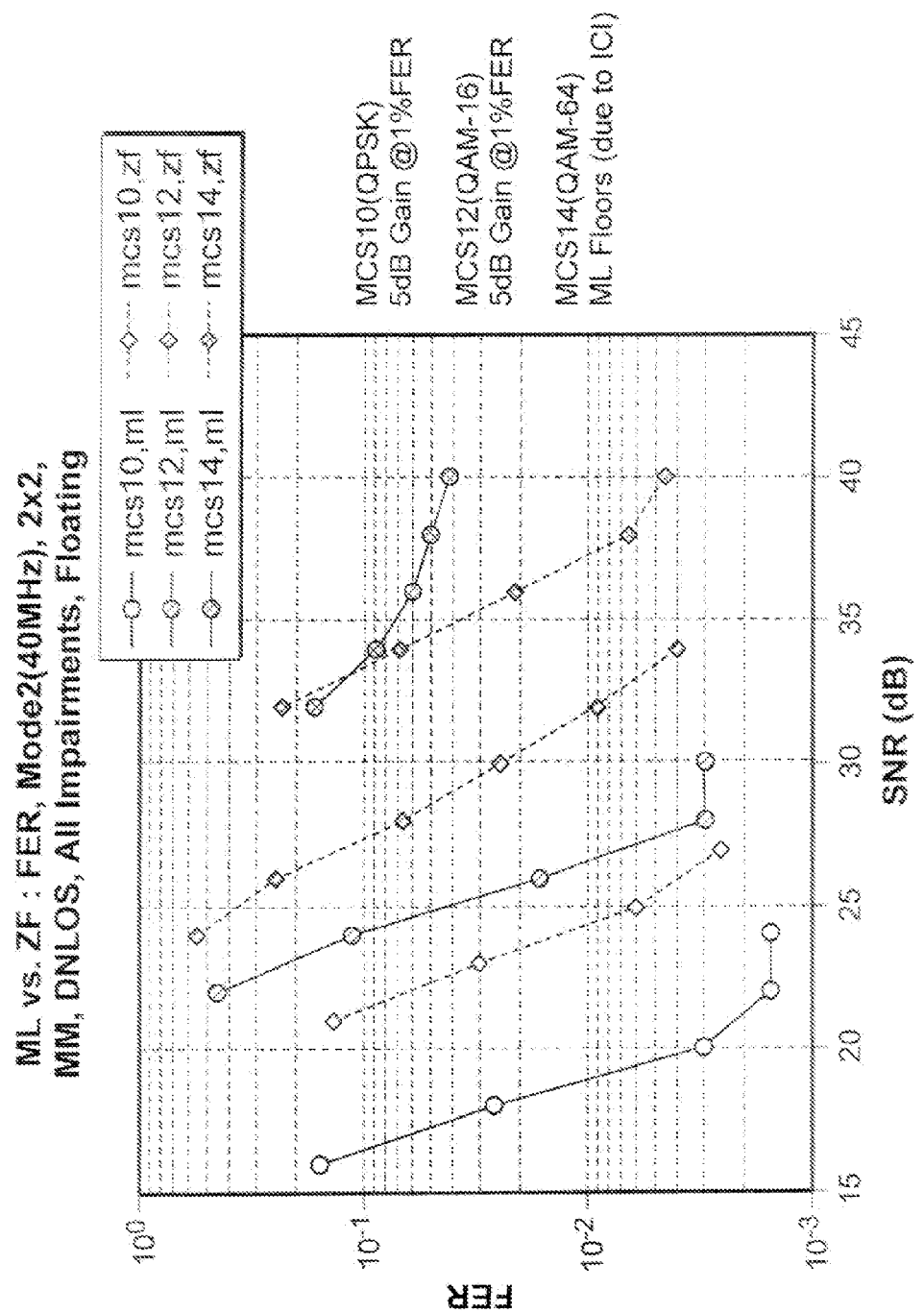
FIGS. 1-4 are graphs illustrating results of performance studies comparing maximum likelihood techniques with zero forcing techniques and plotting frame error rates versus signal to noise ratios for several modulation and coding schemes.
Figure 2:
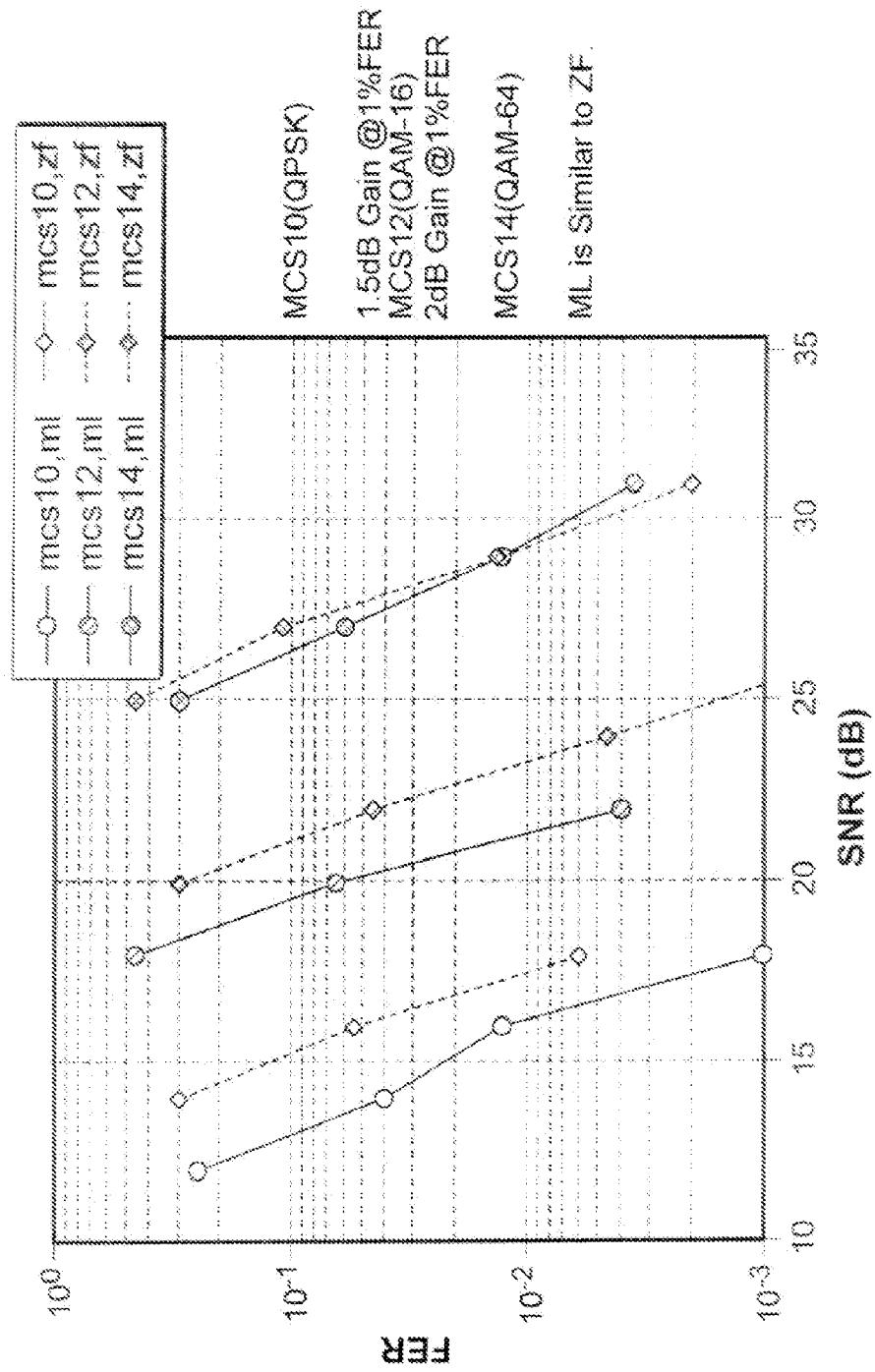

The results illustrated in FIG. 1 were obtained using a 2×2 MIMO configuration and two spatial streams, while the results illustrated in FIG. 2 were obtained using a 2×3 MIMO configuration and two spatial streams. As indicated at the left and center of FIG. 1, for QPSK and QAM-16 modulation schemes, respectively, the ML technique provides approximately a 5 dB gain over the ZF technique at a frame error rate (FER) of about 1%. However, with respect to the higher order modulation (QAM-64) at higher SNRs, the ML technique floors due to ICI as indicated at the right of FIG. 1. As indicated at the left and center of FIG. 2, for QPSK and QAM-16, respectively, the ML technique provides a relatively smaller performance gain (approximately 1.5 or 2.0 dB) over the ZF technique where the FER is about 1%. Also, with respect to QAM-64 at higher SNRs, the ML technique and the ZF technique provide similar performance as indicated at the right of FIG. 2. The improved performance of the ZF systems (in FIG. 2 as compared to FIG. 1) may be attributable to introduction of the additional receive antenna, which provides an additional array gain. The fact that the ML system did not exhibit an error floor in the configuration that provided the FIG. 2 data may also be attributable to the additional receive antenna.

Figure 3:
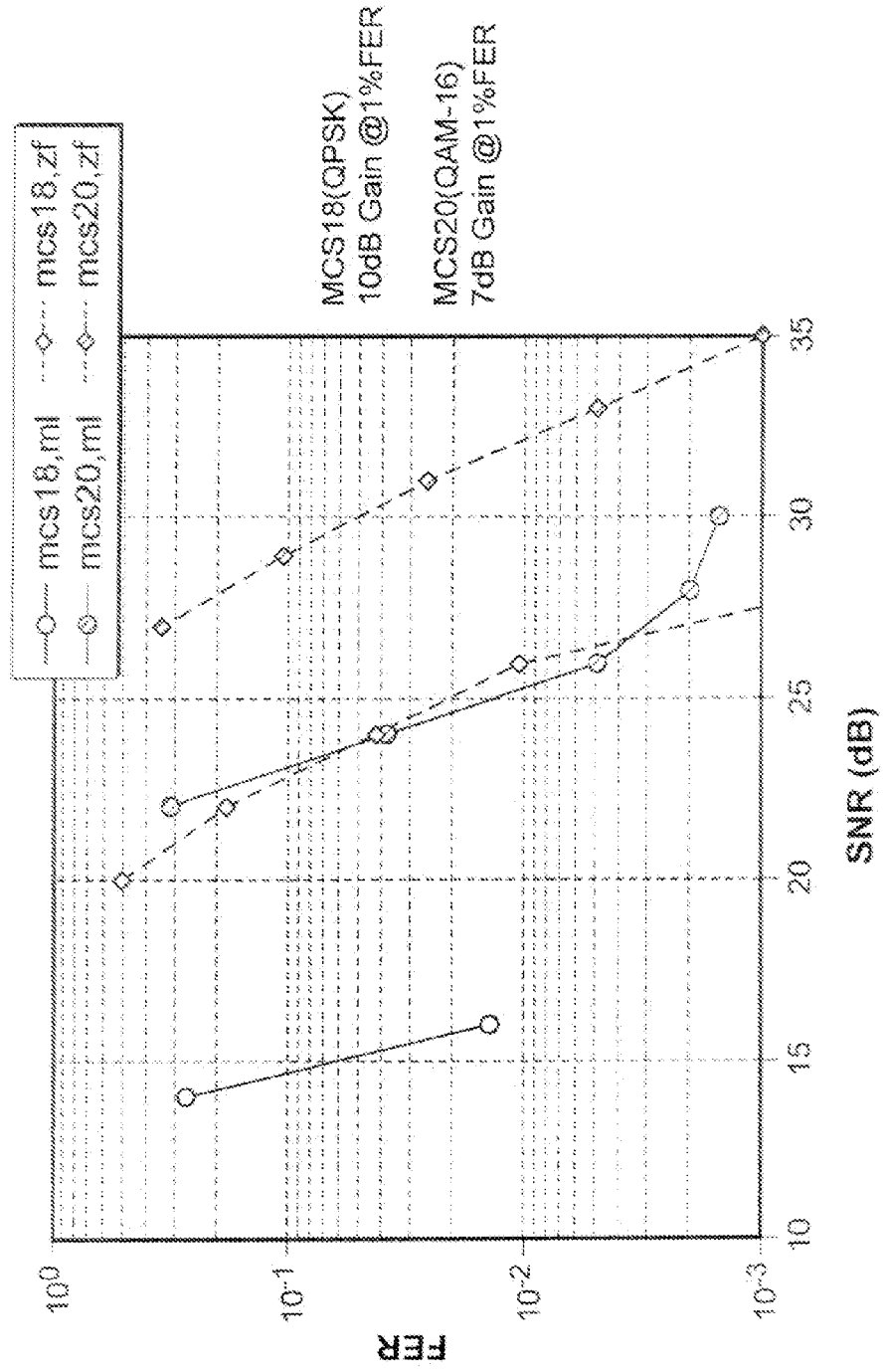
Figure 4:
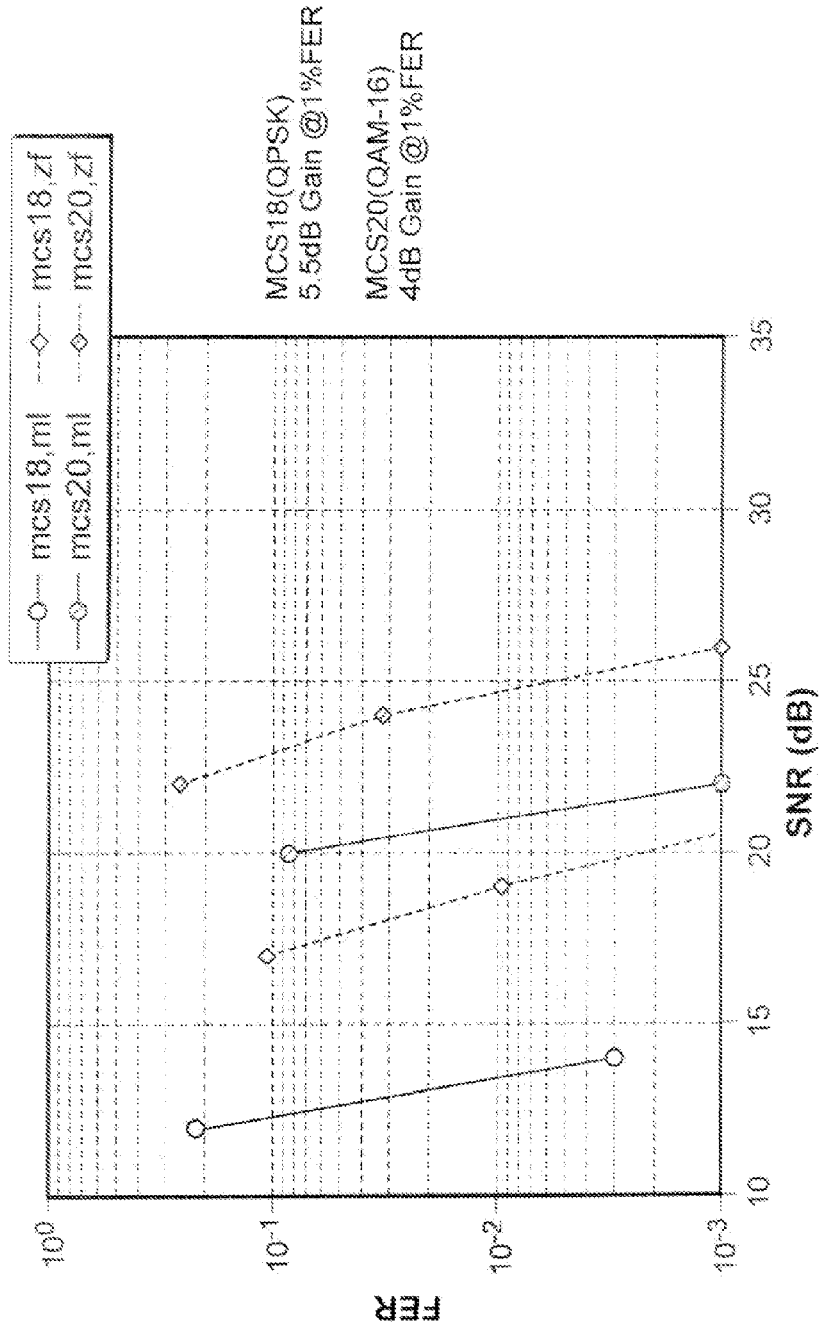

FIGS. 3 and 4 illustrate a similar trend, where the results illustrated in FIG. 3 were obtained using a 3×3 MIMO configuration and three spatial streams, while the results illustrated in FIG. 4 were obtained using a 3×4 MIMO configuration and three spatial streams. With three receive antennae and QPSK modulation, the ML system provides a performance gain of approximately 10 dB where the FER is about 1%; this advantage is reduced to about 5.5 dB where four receive antennae are employed. Similarly, a performance gain of about 7 dB is reduced to about 4 dB where an additional receive antenna is used with QAM-16 modulation.

As is clearly indicated by the data, the performance advantages of ML systems decrease when the number of receive antenna paths exceeds the number of spatial streams. The effects of additional array gain may substantially benefit systems employing various types of modulation schemes including, but not limited to, Binary Phase Shift Keying (BPSK), QPSK, QAM-16, and QAM-64. Also, the data show that for higher order modulations with high coding rates operating at high SNRs (e.g., QAM-64, rate ¾), ML systems may experience the error floor phenomenon due to practical impairments that result in ICI or that otherwise create deleterious RF interference.

Figure 5:
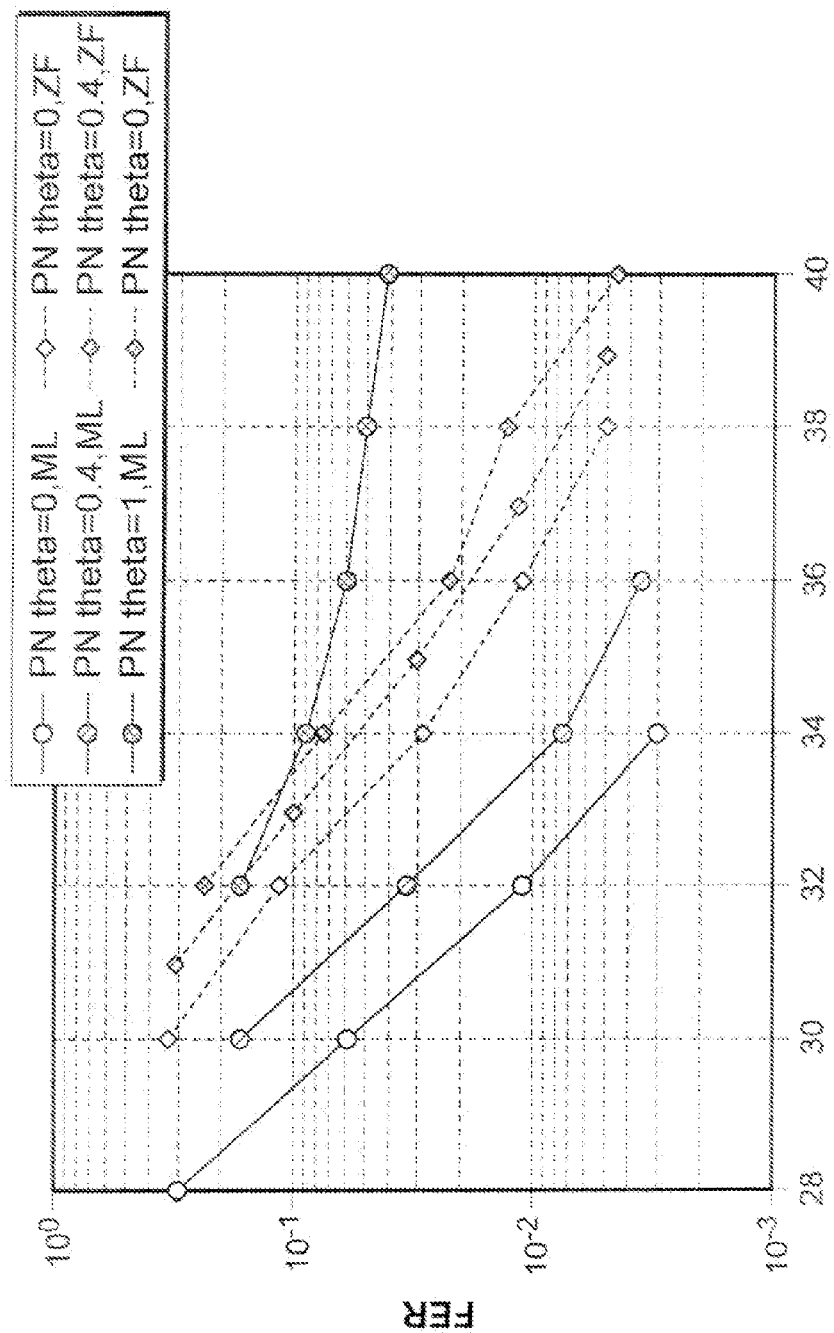
FIGS. 5-6 are graphs illustrating results of performance studies comparing maximum likelihood techniques with zero forcing techniques and plotting frame error rates versus signal to noise ratios taking into account phase noise effects.
Figure 6:
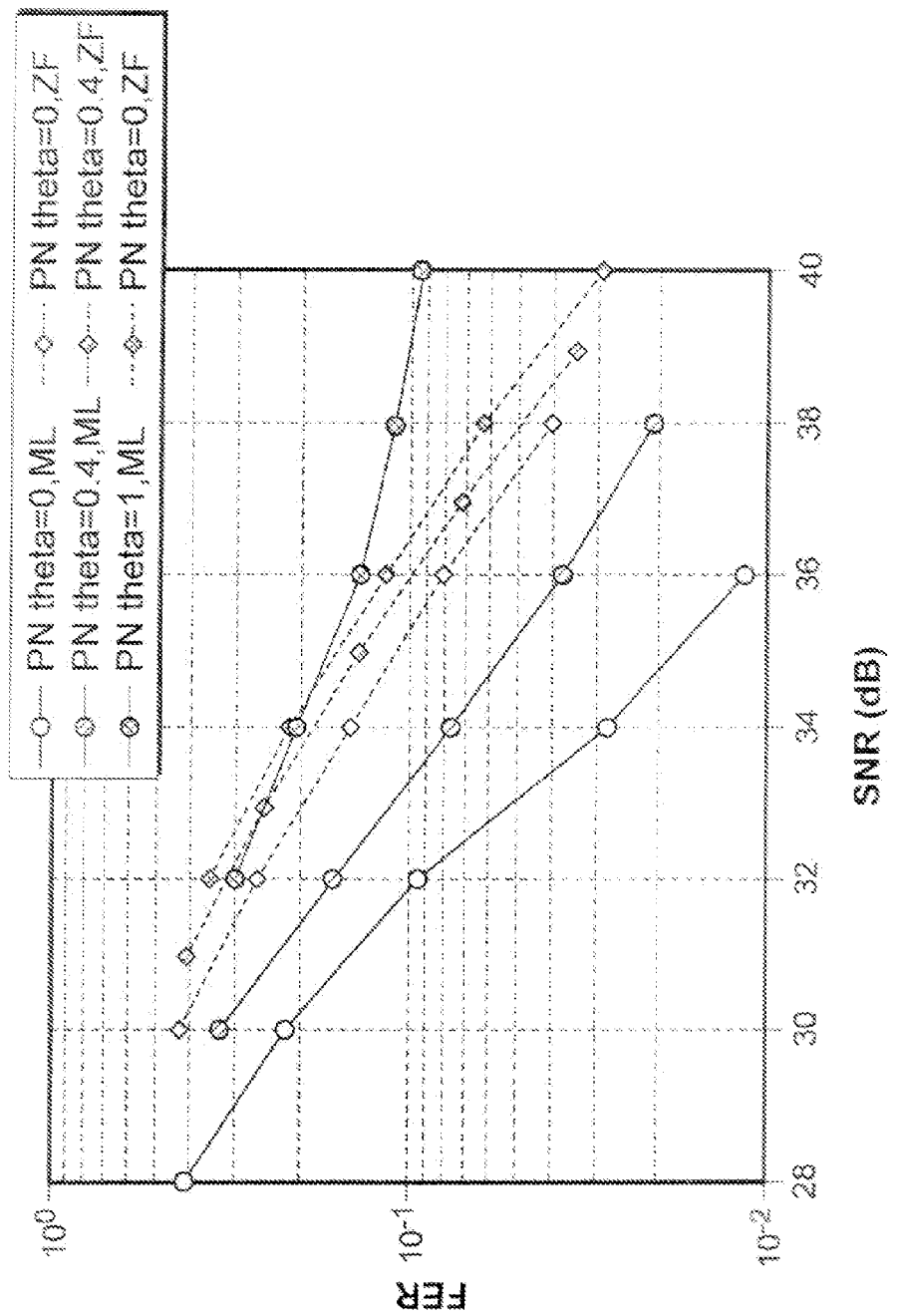

FIGS. 5-6 are graphs illustrating results of performance studies comparing maximum likelihood techniques with zero forcing techniques and plotting frame error rates versus signal to noise ratios taking into account phase noise effects. The data for FIG. 5 were obtained on a DNLOS channel, while the data in FIG. 6 were obtained on a BNLOS channel, which is relatively less frequency selective. The results illustrated in FIGS. 5 and 6 were obtained using a 2×2 MIMO configuration and two spatial streams; as indicated in the legends, the root mean square phase noise values were θ=0.0, θ=0.4, and θ=1.0. One goal of the study that resulted in the data of FIGS. 5 and 6 was to determine a phase noise value at which an ML system might fail, i.e., exhibit an error floor and substantially underperform a ZF system. A QAM-64 modulation scheme was tested, as this scheme can support both WiFi (e.g., IEEE 802.11n) and WiMAX (e.g., IEEE 802.16) applications.

Ideally, the rms of the angle (θ) value for phase noise is 0; in this situation, an exhaustive search ML system exhibits about a 3.0 dB performance advantage over a ZF system when the FER is about 1%. Where the phase noise has a 0.4 degree rms θ value, however, this advantage decreases to about 2.2 dB for the same FER. Additionally, as can be seen at the two plots furthest to the right of FIGS. 5 and 6, the ML system floors and performs substantially worse than the ZF system at an operating SNR of about 33 dB or 34 dB; these data were obtained using a phase noise having a 1.0 degree rms θ value, which is typical for MIMO systems in WiFi or WiMAX applications.

FIGS. 5 and 6 indicate a marked decrease in performance of ML techniques for higher order modulation schemes with typical phase noise when the operating SNR is above about 33 dB. As the SNR increases (e.g., to the range above about 35 dB), ICI terms tend to dominate over noise power levels, causing the rate of performance degradation in increase.
Implementation In accordance with some embodiments, an equalization system and method alternately implementing both ML and ZF data detection techniques may employ ML detection for lower order modulations (such as QPSK and QAM-16), on the one hand, and ZF detection for higher order modulations (such as QAM-64), on the other hand. In some instances, implementing ML for higher order modulation may become too complex to be practical, and the error floor problem makes such systems inferior to ZF strategies for certain schemes operating at high SNRs in any event. It is difficult to obtain both the benefits of ML and the benefits of ZF in systems with realistic impairments for all modulation codes. Accordingly, a strategy of selectively switching between different data detection techniques depending, for example, upon a given modulation and coding scheme (MCS), desired or required data throughput rates, and operating conditions (such as SNR, phase noise, and other communications parameters), represents a good compromise between overall system performance and implementation complexity.

In that regard, FIG. 7 is a simplified table illustrating certain modulation and coding schemes for wireless fidelity applications. It will be appreciated that only a few MCS options are provided in FIG. 7 by way of example, and that many more MCSs are generally available for a particular communication standard.

For rate adaptation and to maintain a stable or desired physical (PHY) data rate, adaptation techniques may be employed selectively to implement a particular MCS and a specific data detection technique (e.g., either ML or ZF) as a function of operating environment, system capabilities, user or administrator preferences, communications parameters, or a combination of these and other criteria. For example, to maintain a PHY data rate of 162.0 kilobits per second (kbps), either MCS 12 or MCS 19 may be selected. Whereas an ML technique has a 5.5 dB performance advantage over a ZF technique for MCS 19, it may nevertheless be desirable in some circumstances to employ a ZF technique with MCS 12, which only underperforms by 2.5 dB, for the same PHY data rate. This is especially true where phase noise is considered and the system is operating at a high SNR.

In a WiFi or WiMAX system, for example, ML detection may be used for a QPSK MCS, since the number of points in the constellation is generally small (so exhaustive searching may readily be conducted without requiring excessive processing loads) and since the performance gain is substantial over ZF techniques. With respect to a QAM-16 MCS, however, exhaustive search ML schemes may be very difficult to implement; in this case, it may be desirable to use another data detection scheme such as ZF. With respect to QAM-64, for instance, the data in FIGS. 1-6 suggest that ZF strategies are most appropriate. It will be appreciated that other detection techniques may also be implemented. For example, a minimum mean square error (MMSE) approach may be used in lieu of ZF, or may be used in addition to ML or ZF approaches.

Figure 8:
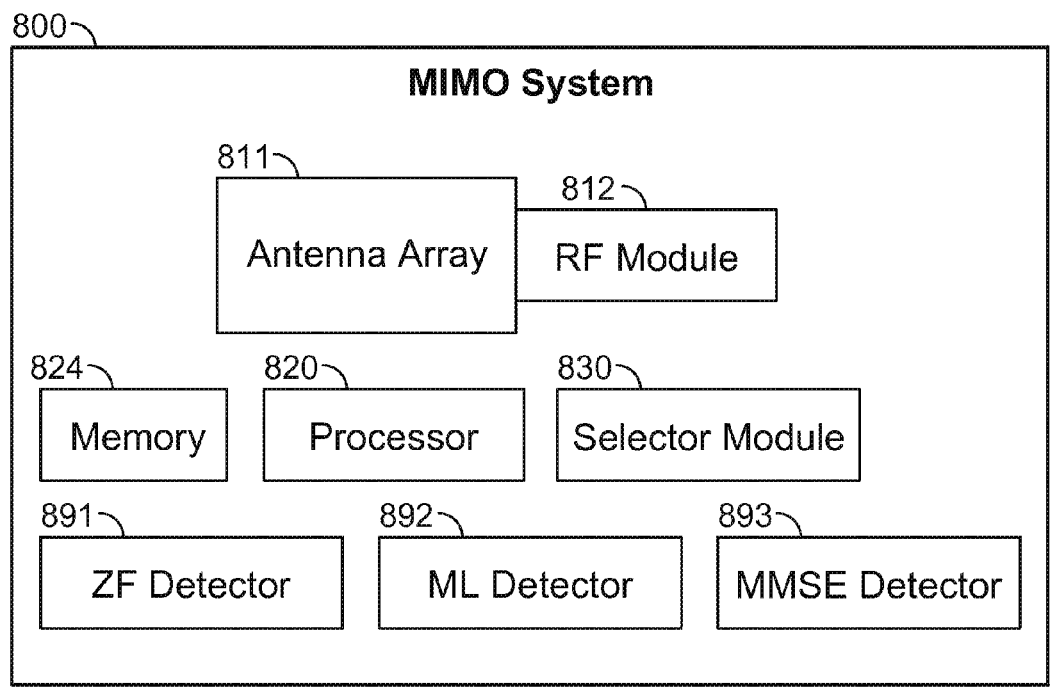
FIG. 8 is a simplified high level functional block diagram of a multiple input, multiple output system capable of alternately implementing different data detection techniques.

In that regard, FIG. 8 is a simplified high level functional block diagram of a multiple input, multiple output system capable of alternately implementing different data detection techniques. As indicated in FIG. 8, a MIMO system 800 may generally comprise an antenna array 811 and RF module 812, a processor 820, a memory 824, a selector module 830, and data detectors 891-893.

In some embodiments, the functional blocks illustrated in FIG. 8 may be implemented as hardware components. For example, the various elements may be integrated into a single, monolithic integrated circuit (IC) or an application specific IC (ASIC). Additionally or alternatively, some or all of the functional blocks may be implemented independently (i.e., on multiple ICs or chips), for instance, using programmable logic hardware or more than one ASIC.

In some implementations, various elements may be programmable or otherwise configurable in accordance with system requirements, communications protocols, and other factors affecting desired or necessary operational characteristics of system 800. In that regard, some of the functional blocks of system 800 may be implemented in software or other encoded instruction sets, for example, executed by processor 820. The instruction sets executed by processor 820 may be stored in memory 824. Accordingly, the term "module" in the context of the following description is intended to encompass both hardware and software embodiments of a particular functional block; those of skill in the art will appreciate that any number of software applications or instruction sets, and various circuitry or hardware components supported by firmware may readily be designed to support the functionality set forth herein.

Antenna array 811 and RF module 812 generally include hardware elements operative to enable bi-directional wireless communications as is generally known. As set forth above, array 811 and module 812 may enable system 800 to communicate in accordance with various standards such as WiFi and WiMAX. Processor 820 may be embodied in or comprise a general purpose microprocessor, microcomputer, microcontroller, or any other type of data processing engine suitably configured and operative to support the functionality of system 800. It will be appreciated that various technologies may have utility in applications of array 811, module 812, and processor 820; the present disclosure is not intended to be limited by the structural nature or operational characteristics of the elements illustrated in FIG. 8.

Selector module 830 may be operative, e.g., under control of or otherwise in cooperation with processor 820, to select a particular detector 891-893 in accordance with various criteria. In that regard, selector module 830 may determine the type of MCS employed by system 800 for particular applications. In some embodiments, a detector 891-893 may be selected in accordance with the detected MCS. For example, if the MCS is QAM-64, ZF detector 891 or MMSE detector 893 may be selected, whereas if the MCS is QPSK or QAM-16, ML detector 892 may be selected.

Additionally or alternatively, a detector 891-893 may be selected in accordance with an operating SNR, a desired PHY data rate, or a combination of these factors. As set forth above with reference to FIGS. 1-6, SNR can affect operation of numerous system components, and in particular, can adversely affect ML techniques when employed in conjunction with certain MCSs. In such embodiments, if the MCS is QAM-64, ZF detector 891 may be selected for a certain SNR or a certain range, whereas MMSE detector 893 may be selected for other SNR values or a different range. In the foregoing manner, even when the MCS does not change, the data detection technique may be tuned in accordance with real-time system operating conditions or other factors.

It will be appreciated that various types of detectors 891-893 are generally known and suitable for wireless communication applications. The present disclosure is not intended to be limited to any particular structural or architectural arrangement for detectors 891-893. Further detectors 891-893 may be configured and operative to execute any of various algorithms or instruction sets generally known or developed in accordance with known principles. Any suitable hardware element, ASIC, or other circuitry adapted to perform zero forcing detection, exhaustive search ML detection, and MMSE detection is contemplated for detectors 891-893, respectively.

Figure 9:
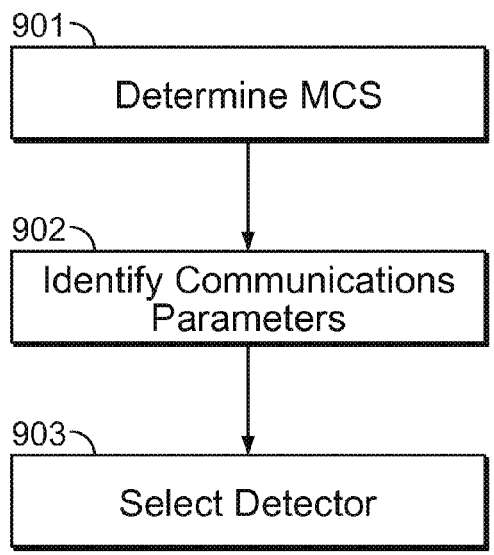
FIG. 9 is a simplified flow diagram illustrating operation of one embodiment of a method of selecting a data detection strategy for a multiple input, multiple output system.

FIG. 9 is a simplified flow diagram illustrating operation of one embodiment of a method of selecting a data detection strategy for a multiple input, multiple output system. It will be appreciated that the operations depicted in FIG. 9 may readily be executed by, e.g., the system 800 illustrated in FIG. 8 or by any similarly capable system.

As indicated at block 901, a method of selecting a data detector may begin by determining an MCS employed by the MIMO system. In some instances, a detector may be selected (block 903) in accordance with the MCS. For example, where only two detectors (one of which is an ML detector) may be employed and the MCS is QAM-64, a detector (e.g., a ZF or MMSE detector) other than the ML detector may be selected based (solely, in this case) upon the MCS.

In some implementations, selection of a detector (at block 903) may additionally be facilitated by identifying communications parameters or other operating conditions as indicated at block 902. For example, a PHY data rate or operating SNR may be identified at block 902, and this identification may influence selection at block 903. In these embodiments, an appropriate data detection technique may be implemented in accordance with operating conditions (such as varying SNR, real-time processing loads, and the like) even when the MCS is not changed.

As set forth above, a system and method as described herein may employ exhaustive search ML data detection at lower order modulations, while selecting ZF or MMSE data detection at higher order modulations, higher SNR values, or both. It will be appreciated that, in this context "lower order" modulation generally defines constellations having relatively fewer points than "higher order" modulation. While BPSK, QPSK, and QAM-16 are generally considered lower order and QAM-64 is generally considered higher order, the present disclosure is not intended to be limited to these MCSs. It will be appreciated that the relative distance between the constellation points is generally shorter for higher order modulations. In some embodiments, it may be desirable to select a data detection technique based upon the normalized Euclidian distance between the receive point and all the constellation points, where greater distances generally represent lower order modulation schemes.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed:

1. A method, comprising:
   determining, using one or more integrated circuit (IC) devices, a particular modulation and coding scheme (MCS) of a plurality of MCSs employed by a multiple input, multiple output (MIMO) system;
   determining, using one or more IC devices, a communication parameter associated with the MIMO system; and
   selecting, using one or more IC devices, a particular data detection technique of a plurality of data detection techniques employed by a communication device, the selection being based on (i) the MCS and (ii) the communication parameter,
   wherein
   (i) at least one data detection technique of the plurality of data detection techniques is selectable in accordance with more than one MCS of the plurality of MCSs, and
   (ii) for at least one MCS, different data detection techniques are selectable depending at least on the communication parameter.

2. The method of claim 1, wherein:
   determining the communication parameter comprises determining a desired data rate; and
   selecting the particular data detection technique is based on (i) the MCS and (ii) the desired data rate.

3. The method of claim 1, wherein:
   determining the communication parameter comprises determining an operating signal to noise ratio (SNR); and
   selecting the particular data detection technique is based on (i) the MCS and (ii) the SNR.

4. The method of claim 1, wherein:
   determining the communication parameter comprises determining a phase noise parameter; and
   selecting the particular data detection technique is based on (i) the MCS and (ii) the phase noise parameter.

5. The method of claim 1, wherein:
   determining the communication parameter comprises determining a number of receive antennas utilized at the communication device; and
   selecting the particular data detection technique is based on (i) the MCS and (ii) the number of receive antennas utilized at the communication device.

6. The method of claim 1, wherein the plurality of data detection techniques includes a maximum likelihood data detection technique.

7. The method of claim 1, wherein:
   the communication parameter is a first communication parameter; and
   the method further comprises
   determining, using one or more IC devices, a second communication parameter associated with the MIMO system, and
   selecting the particular data detection technique is based on (i) the MCS, (ii) the first communication parameter, and (iii) the second communication parameter.

8. The method of claim 6, wherein the plurality of data detection techniques includes at least one of (i) a zero forcing data detection technique, and (ii) a minimum mean square error (MMSE) data detection technique.

9. A communication device, comprising:
   a processor;
   a plurality of data detectors wherein each respective one of the plurality of data detectors is configured to employ a respective data detection technique; and
   a selector module configured to select, in cooperation with the processor, one of the data detectors in the plurality of data detectors to decode a data stream received by the communication device via a multiple input, multiple output (MIMO) communication channel, the selection being based on (i) an employed modulation and coding scheme (MCS) from a plurality of alternative MCSs, and (ii) a communication parameter,
   wherein
   (i) at least one of the data detectors is selectable in accordance with more than one MCS, and (ii) for at least one MCS, different ones of the plurality of data detectors are selectable depending at least on the communication parameter.

10. The communication device of claim 9, wherein the plurality of data detectors comprises a maximum likelihood detector.

11. The communication device of claim 9, wherein the plurality of data detectors comprises a zero forcing (ZF) detector.

12. The communication device of claim 9, wherein the plurality of data detectors comprises a minimum mean square error (MMSE) detector.

13. The communication device of claim 9, wherein:
the communication parameter comprises a desired data rate; and
selector module is configured to select one of the data detectors in the plurality of data detectors based on (i) the employed MCS, and (ii) the desired data rate.

14. The communication device of claim 9, wherein:
the communication parameter comprises an operating (SNR); and
the selector module is configured to select one of the data detectors in the plurality of data detectors based on (i) the employed MCS, and (ii) the SNR.

15. The communication device of claim 9, wherein:
the communication parameter comprises a phase noise parameter; and
the selector module is configured to select one of the data detectors in the plurality of data detectors based on (i) the employed MCS, and (ii) the phase noise parameter.

16. The communication device of claim 9, wherein:
the communication parameter comprises a number of receive antennas; and
the selector module is configured to select one of the data detectors in the plurality of data detectors based on (i) the employed MCS, and (ii) the number of receive antennas.

17. The communication device of claim 9, further comprising a radio frequency (RF) module configured to transmit and receive via the MIMO communication channel.

18. The communication device of claim 17, further comprising an antenna array coupled to the RF module.

19. A tangible, non-transitory computer readable storage medium or media having stored thereon instructions that, when executed by a processor, cause the processor to:
determine a particular modulation and coding scheme (MCS) of a plurality of MCSs employed by a multiple input, multiple output (MIMO) system;
determine a communication parameter associated with the MIMO system; and
select a particular data detection technique of a plurality of data detection techniques employed by a communication device, the selection being based on (i) the MCS and (ii) the communication parameter,
wherein
(i) at least one data detection technique of the plurality of data detection techniques is selectable in accordance with more than one MCS of the plurality of MCSs, and
(ii) for at least one MCS, different data detection techniques are selectable depending at least on the communication parameter.

20. The storage medium of claim 19, having stored thereon instructions that, when executed by a processor, cause the processor to:
determine a desired data rate as at least part of determining the communication parameter; and
select the particular data detection technique based on (i) the MCS and (ii) the desired data rate.

21. The storage medium of claim 19, having stored thereon instructions that, when executed by a processor, cause the processor to:
determine an operating signal to noise ratio (SNR) as at least part of determining the communication parameter; and
select the particular data detection technique based on (i) the MCS and (ii) the SNR.

22. The storage medium of claim 19, having stored thereon instructions that, when executed by a processor, cause the processor to:
determine a phase noise parameter as at least part of determining the communication parameter; and
select the particular data detection technique based on (i) the MCS and (ii) the phase noise parameter.

23. The storage medium of claim 19, having stored thereon instructions that, when executed by a processor, cause the processor to having stored thereon instructions that, when executed by a processor, cause the processor to:
determine a number of receive antennas utilized at the communication device as at least part of determining the communication parameter; and
select the particular data detection technique based on (i) the MCS and (ii) the number of receive antennas utilized at the communication device.

* * * * *